US010235576B2

(12) United States Patent
Yeh et al.

(10) Patent No.: US 10,235,576 B2
(45) Date of Patent: Mar. 19, 2019

(54) ANALYSIS METHOD OF LANE STRIPE IMAGES, IMAGE ANALYSIS DEVICE, AND NON-TRANSITORY COMPUTER READABLE MEDIUM THEREOF

(71) Applicant: WISTRON CORP., New Taipei (TW)

(72) Inventors: Shang-Min Yeh, New Taipei (TW); Ming-Che Ho, New Taipei (TW); Yu-Wen Huang, New Taipei (TW); Yueh-Chi Hung, New Taipei (TW); Yi-Sheng Chao, New Taipei (TW)

(73) Assignee: WISTRON CORP., New Taipei (TW)

( * ) Notice: Subject to any disclaimer, the term of this patent is extended or adjusted under 35 U.S.C. 154(b) by 140 days.

(21) Appl. No.: 15/331,635

(22) Filed: Oct. 21, 2016

(65) Prior Publication Data
US 2017/0351925 A1   Dec. 7, 2017

(30) Foreign Application Priority Data
Jun. 1, 2016   (TW) .............................. 105117239 A

(51) Int. Cl.
*G06K 9/00* (2006.01)
*B60R 11/04* (2006.01)
(Continued)

(52) U.S. Cl.
CPC .......... *G06K 9/00798* (2013.01); *B60R 11/04* (2013.01); *G06K 9/3208* (2013.01);
(Continued)

(58) Field of Classification Search
CPC .......... G06K 9/00798; B60T 2201/089; B60T 2201/08; G05D 1/0246;
(Continued)

(56) References Cited

U.S. PATENT DOCUMENTS

| 8,605,947 B2 | 12/2013 | Zhang et al. |
| 2013/0272577 A1 | 10/2013 | Sakamoto |

FOREIGN PATENT DOCUMENTS

| TW | I337144 B | 2/2011 |
| TW | 201533714 A | 9/2015 |

OTHER PUBLICATIONS

Taiwan Office Action dated Jul. 10, 2017 in application No. 105117239.
(Continued)

*Primary Examiner* — Charlotte M Baker
(74) *Attorney, Agent, or Firm* — Maschoff Brennan

(57) ABSTRACT

An analysis method of lane stripe images, an image analysis device and a non-transitory computer readable medium thereof are provided to perform steps of: setting a reference point as a center to recognize the lane stripe image in a plurality of default directions; defining a plurality of preset sections onto the lane stripe image and determining a characteristic value of the lane stripe image in each of the preset sections whenever the lane stripe image is recognized in one of the default directions; determining a first feature parameter according to the characteristic values of the lane stripe image in the preset sections when the lane stripe image is recognized in at least one of the default directions; and determining an actual lane parameter of the lane stripe image according to at least the first feature parameter.

24 Claims, 15 Drawing Sheets

(51) Int. Cl.
  *G06K 9/32* (2006.01)
  *G06K 9/40* (2006.01)
  *G06K 9/46* (2006.01)
  *G06K 9/62* (2006.01)
(52) U.S. Cl.
  CPC ............ *G06K 9/40* (2013.01); *G06K 9/4604* (2013.01); *G06K 9/6203* (2013.01)
(58) Field of Classification Search
  CPC .. G06T 2207/30256; B60W 2420/403; B60W 2510/20; B60W 2520/14; B60W 2520/28
  USPC ....... 382/103, 104; 340/435; 701/1; 348/148
  See application file for complete search history.

(56) References Cited

OTHER PUBLICATIONS

Aly, M., "Real time Detection of Lane Markers in Urban Streets", IEEE Intelligent Vehicles Symposium, Jun. 2008, pp. 1-6.

Bhati, A., and Somani, R.K., "Partition based Hough Transformation for Real Time Road Lane Detection", IEICE Transactions on Fundamentals of Electronics Communications and Computer Sciences, vol. 2, No. 4, Sep. 2013, pp. 1117-1122.

López, A., et al., "Detection of Lane Markings based on Ridgeness and RANSAC", Proceedings of the 8th International IEEE Conference on Intelligent Transportation Systems, Sep. 2005, pp. 733-738.

López, A., et al., "Robust lane markings detection and road geometry computation", International Journal of Automotive Technology, vol. 11, Issue 3, Jun. 2010, pp. 1-14.

Ponsa, D., et al., "On-board image-based vehicle detection and tracking", Transactions of the Institute of Measurement and Control, vol. 33, No. 7, 2011, pp. 783-805.

ANALYSIS METHOD OF LANE STRIPE IMAGES, IMAGE ANALYSIS DEVICE, AND NON-TRANSITORY COMPUTER READABLE MEDIUM THEREOF

CROSS-REFERENCE TO RELATED APPLICATIONS

This non-provisional application claims priority under 35 U.S.C. § 119(a) on Patent Application No(s). 105117239 filed in Taiwan, R.O.C. on Jun. 1, 2016, the entire contents of which are hereby incorporated by reference.

BACKGROUND

Technical Field

The disclosure relates to an analysis method of lane stripe images, an image analysis device and a non-transitory computer readable medium thereof, more particularly to an image analysis device, an analysis method and a non-transitory computer readable medium thereof for sorting lane stripe images.

Related Art

Recently, automatic driving technology has widely been paid attention to, and more and more automotive manufacturers and enterprises endeavor to develop it. The core of the automatic driving technology is based on advanced driving assistance systems (ADAS) and includes lane departure warning, collision warning, automate braking and so on.

However, the automatic driving technology must detect real-time traffic states anytime for the real-time determination of driving. Moreover, various traffic states lead to the difficulty in automate driving. To achieve a variety of requirements of the automatic driving technology and the sufficient speeds of calculation and recognition, automatic driving assistance systems need high standard performance for the determination of automate driving and the complicated data process. That is why the cost of an automatic driving assistance system can not be reduced.

SUMMARY

According to one or more embodiments, an analysis method of lane stripe images includes the following steps: setting a reference point as a center to recognize the lane stripe image in a plurality of default directions; defining a plurality of preset sections, which is arranged in parallel in a reference line vertical to the default direction, onto the lane stripe image whenever the lane stripe image is recognized in one of the default directions; determining a characteristic value of the lane stripe image in each of the preset sections; determining a first feature parameter according to the characteristic values of the lane stripe image in the preset sections when the lane stripe image is recognized in at least one of the default directions; and determining at least one actual lane parameter of the lane stripe image related to an environmental message of one or more real lanes according to at least the first feature parameter.

According to one or more embodiments, an image analysis device includes a projection computing module, a processing module and a determination module. The projection computing module is capable of setting a reference point as a center to recognize a lane stripe image in a plurality of default directions. Whenever the lane stripe image is recognized in one of the default directions, a plurality of preset sections is defined onto the lane stripe image, and a characteristic value of the lane stripe image in each of the preset sections is determined. The preset sections are arranged in parallel in a reference line vertical to the default direction. The processing module is electrically connected to the projection computing module and is capable of determining a first feature parameter according to the characteristic values of the lane stripe image in the preset sections when the lane stripe image is recognized in at least one of the default directions. The determination module is electrically connected to the processing module and is capable of determining at least one actual lane parameter of the lane stripe image according to at least the first feature parameter. The actual lane parameter is related to an environmental message of one or more real lanes.

According to one or more embodiments, a non-transitory computer readable medium is loaded in and executable to an electronic device that includes a projection computing module, a processing module and a determination module, to perform the following steps: driving the projection computing module to set a reference point as a center to recognize a lane stripe image in a plurality of default directions; driving the projection computing module to define a plurality of preset sections, which is arranged in parallel in a reference line vertical to the default direction, onto the lane stripe image and determine a characteristic value of the lane stripe image in each of the preset sections whenever the lane stripe image is recognized in one of the default directions; driving the processing module to determine a first feature parameter related to the characteristic values of the lane stripe image in the preset sections when the lane stripe image is recognized in at least one of the default directions; driving the determination module to determine at least one actual lane parameter of the lane stripe image, related to an environmental message of one or more real lanes, according to at least the first feature parameter.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
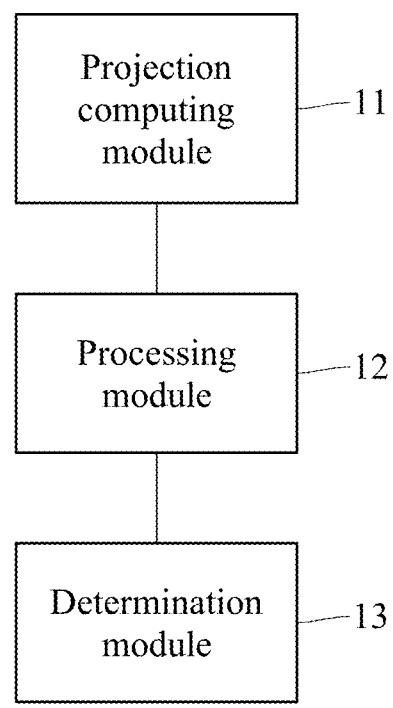
FIG. 1A is a block diagram of an image analysis device according to an embodiment of the disclosure.
Figure 1B:
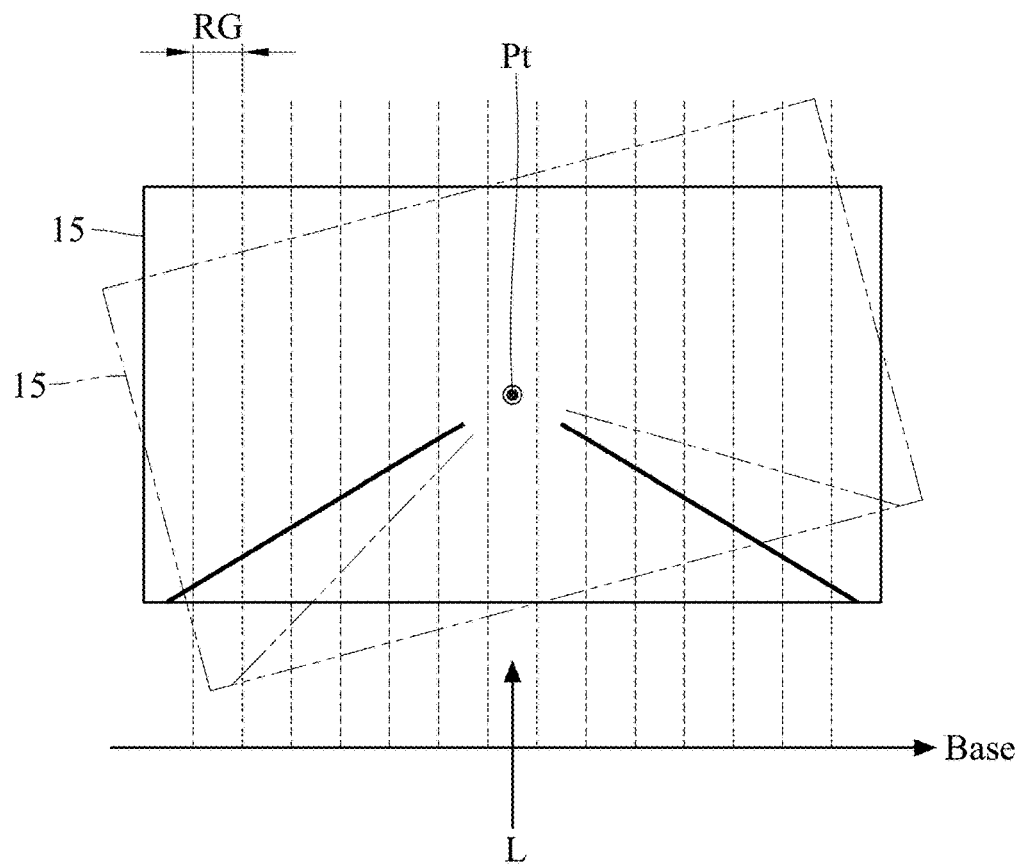
FIG. 1B is a schematic view of a lane stripe image according to an embodiment of the disclosure.

Please refer to FIG. 1A and FIG. 1B. FIG. 1A is a block diagram of an image analysis device according to an embodiment of the disclosure, and FIG. 1B is a schematic view of a lane stripe image according to an embodiment of the disclosure. As shown in the figures, an image analysis device 10 includes a projection computing module 11, a processing module 12 and a determination module 13. The processing module 12 is electrically connected to the projection computing module 11 and the determination module 13. The projection computing module 11 receives a lane stripe image 15 and sets a reference point as a center in the lane stripe image 15 to recognize the lane stripe image 15 in a plurality of default directions. In an embodiment, the manner used by the projection computing module 11 to recognize the lane stripe image 15 exemplarily includes the following steps. The lane stripe image 15 is clockwisely rotated by a variety of preset angles, which have an interval of 15° therebetween, from 0° to 90°. Whenever the lane stripe image 15 is rotated to one of the preset angles, the projection computing module 11 defines a plurality of preset sections RG onto the lane stripe image 15 and determines the characteristic value of the lane stripe image 15 in each of the preset sections RG. The preset sections RG are arranged in parallel in a reference line Base vertical to a default direction L. Specifically, the projection computing module 11 defines the preset sections RG onto the lane stripe image 15 and determines the characteristic values of the lane stripe image 15 in the preset sections RG when the lane stripe image 15 is, for example, respectively and progressively rotated to 15°, 30°, 45° and so on. In this embodiment, even though the projection computing module 11 has not been rotated the lane stripe image 15 yet (i.e. the preset angle is 0°), the projection computing module 11 also defines the preset sections RG onto the lane stripe image 15 and determines the characteristic values of the lane stripe image 15 in the preset sections RG.

In practice, the reference line Base is, for example, a virtual line parallel to an edge of the lane stripe image 15 when the lane stripe image 15 has not been rotated, and the preset sections RG are, for example, image sections arranged in parallel along the above edge of the lane stripe image 15. In another embodiment, recognizing a lane stripe image in a plurality of default directions is rotating a reference line and preset sections instead of rotating the lane stripe image. Particularly, the above reference line is clockwisely rotated to a variety of angles with an interval of 15° therebetween from 0° to 90° relative to a reference point as a center of rotation, and a plurality of preset sections, which is arranged in parallel along the reference line, is defined onto the lane stripe image, so as to determine the characteristic values of the lane stripe image in the preset sections. In other words, in this embodiment, whenever the reference line is rotated to one of the preset angles, the lane stripe image is recognized in a direction vertical to the reference line. Then, a plurality of preset sections, which is arranged in parallel along the reference line, is defined onto the lane stripe image, and the characteristic value of the lane stripe image in each of the preset sections is determined. For a concise description, the following embodiments are based on the case of rotating lane stripe images, but are not used to limit the possible implementations of recognizing lane stripe images in the disclosure.

The characteristic value of the lane stripe image in each of the preset sections is, for example, the number of pixels occupied by a lane stripe, the number of units of block or other suitable characteristic value. For example, the reference line is parallel to a row of pixels in the lane stripe image that has not been rotated yet, and a preset section is a couple of columns of pixels in the lane stripe image that has not been rotated yet. For example, the characteristic value of the lane stripe image in a preset section is the number of pixels, occupied by a fraction of a lane stripe, in a column of pixels in the lane stripe image. As another example, the preset sections are sections arranged in parallel along the reference line and have the same width. In each of the preset sections, there is a plurality of units of block, having the same length and arranged in parallel along a direction vertical to the reference direction. The characteristic value of the lane stripe image in each preset section is the number of units of block occupied by a fraction of a lane stripe in each preset section in the lane stripe image.

The processing module 12 determines a first feature parameter (referred to as test parameter) according to the characteristic values of the lane stripe image in the preset sections when the projection computing module 11 recognizes the lane stripe image in at least one of the default directions. Based on the previous example, the first feature parameter includes, for example, the number of units of block occupied by the lane stripe in each of the preset sections when the lane stripe image has not been rotated, the number of units of block occupied by the lane stripe in each of the preset sections when the lane stripe image is clockwisely rotated by a 15° angle, the number of units of block occupied by the lane stripe in each of the preset sections when the lane stripe image is clockwisely rotated by a 30° angle, or the others that can be deduced by analogy. Alternatively, the first feature parameter is, for example, the sum of the numbers of units of block occupied by the lane stripe in each of the preset sections when the lane stripe image has not been rotated and is rotated by an angle of 15°, 30°, 45° and so on. This embodiment is not limited to the number of first feature parameters. The processing module 12 may transform the characteristic values into a first feature parameter by other calculating manners, and this embodiment has no limitation thereon.

The determination module 13 determines at least one actual lane parameter of the lane stripe image according to the first feature parameter. The actual lane parameter is related to an environmental message of one or more real lanes, such as the width of the real lane, the curvature of the real lane, the actual distance between the left lane stripe and the vehicle, a vehicle's front rake angle, the angle between the lane centerline and the vehicle centerline, or others. When the determination module 13 determines the actual lane parameter of the lane stripe image according to the first feature parameter, the actual lane parameter can be considered the real situation of the lane while the lane stripe image is captured.

The determination module 13 determines the model category of the lane stripe image by, for example, the support vector machine (SVM), deep learning or other suitable algorithms, and this embodiment is not limited thereto.

Figure 2:
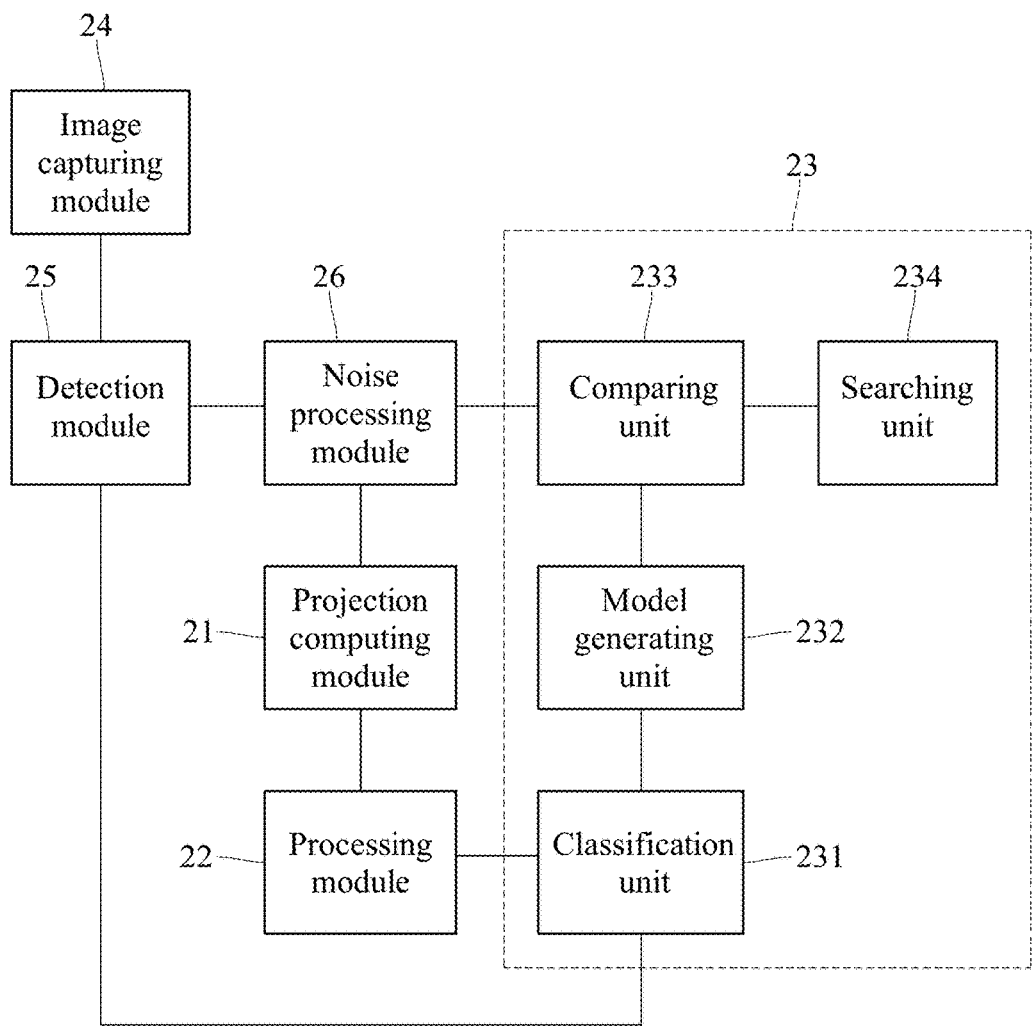
FIG. 2 is a block diagram of an image analysis device according to another embodiment of the disclosure.
Figure 3A:
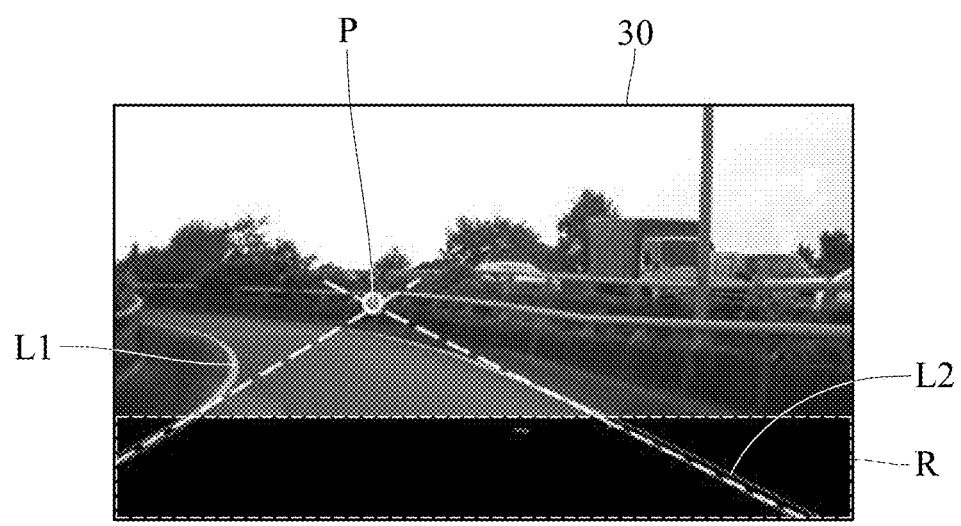
FIGS. 3A to 3E are schematic views of a roadway image and a lane stripe image according to the embodiment in FIG. 2.
Figure 3B:
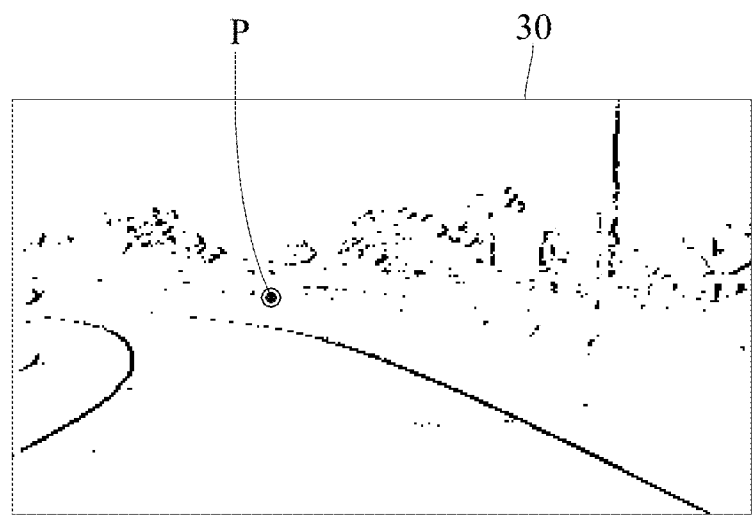
Figure 3C:
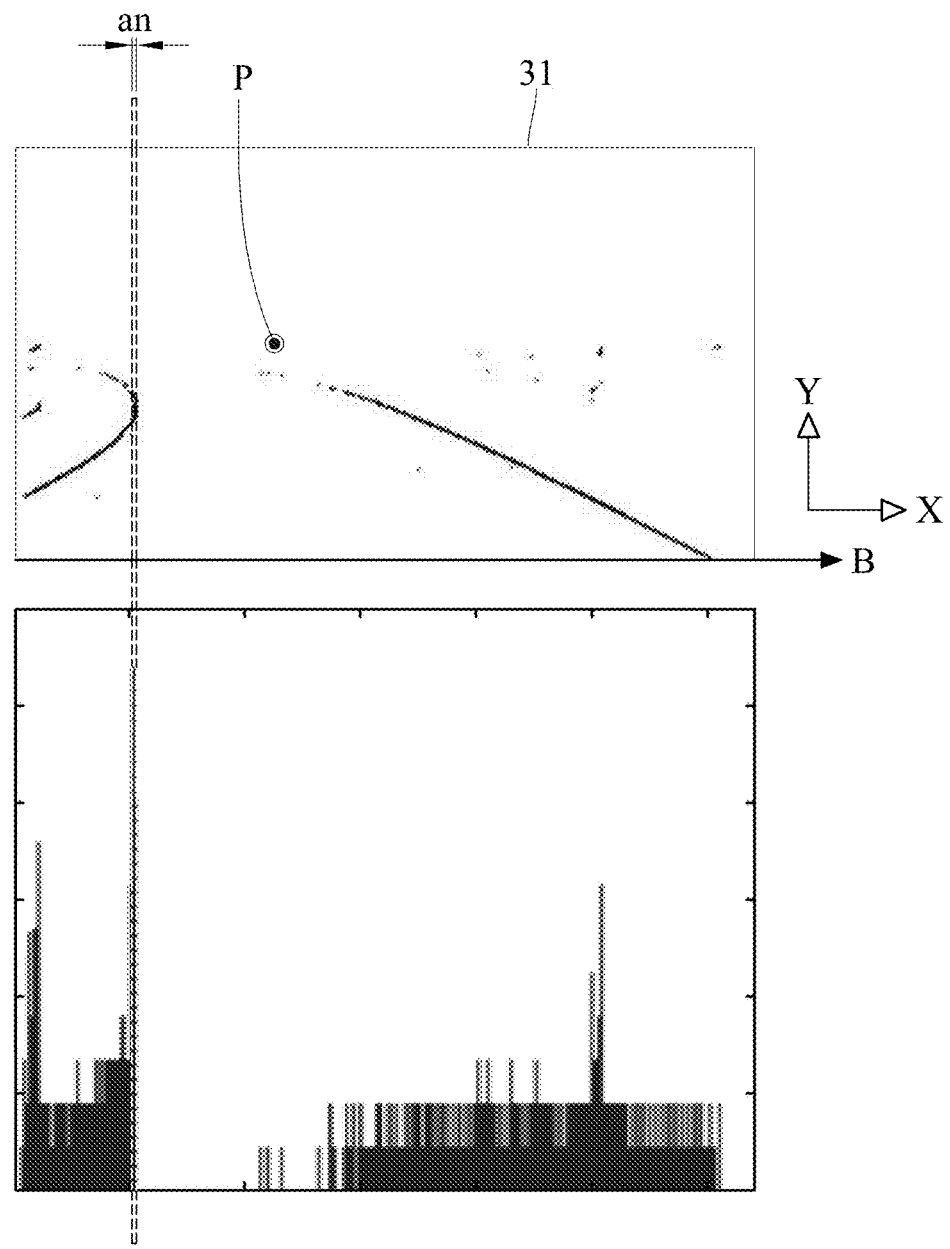
Figure 3D:
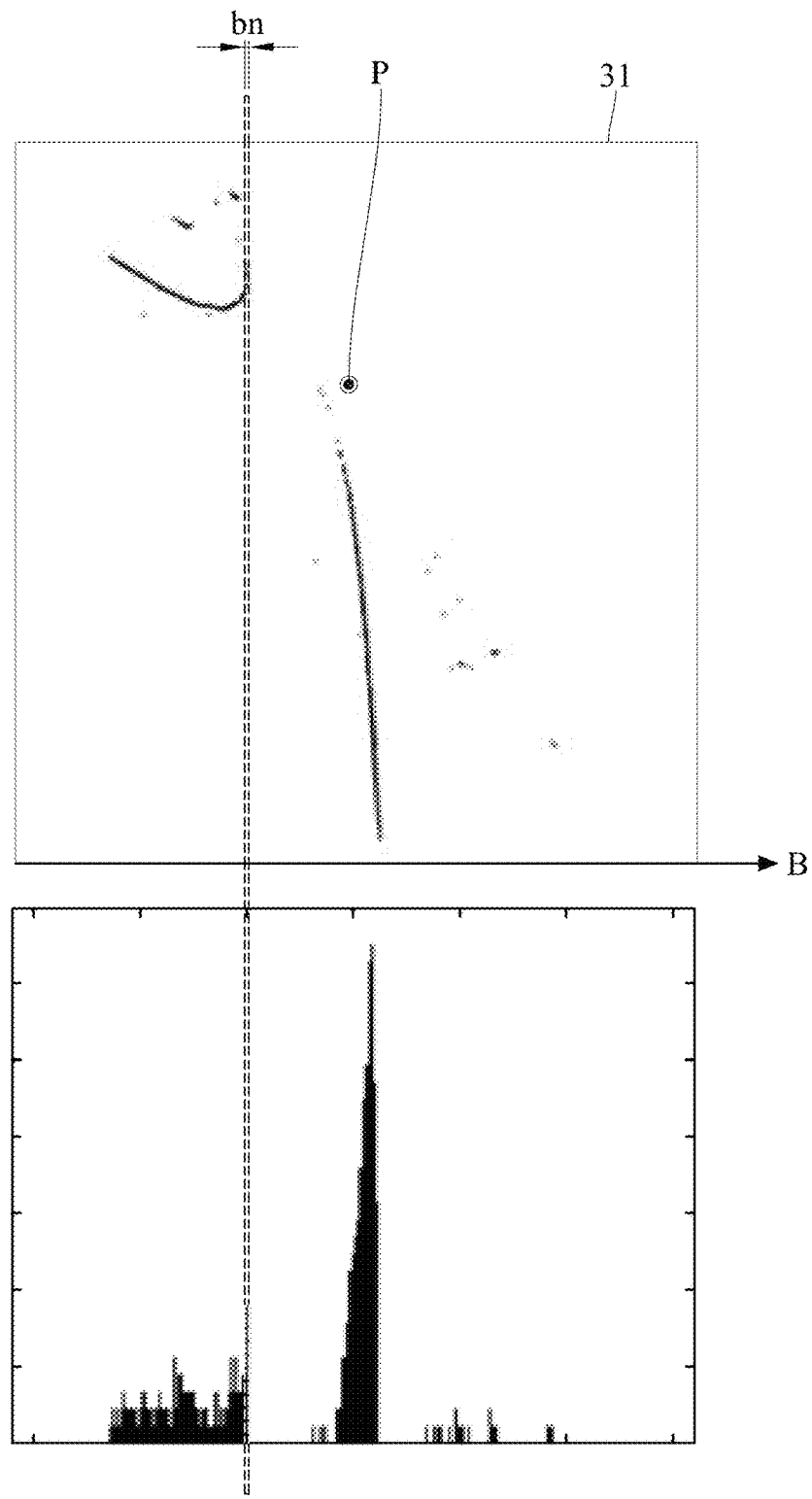
Figure 3E:
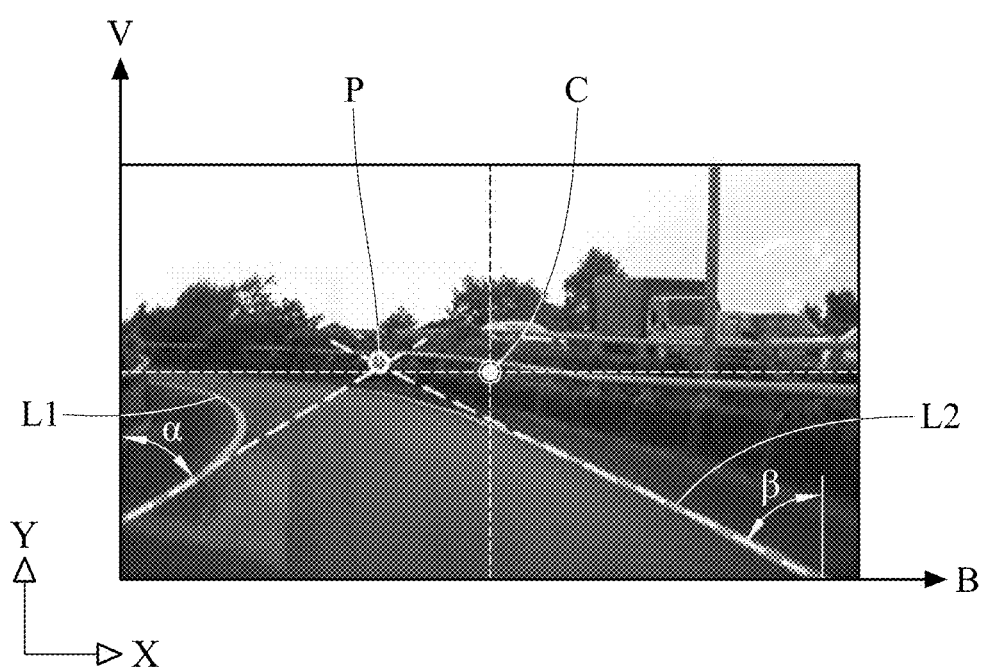
Figure 4A:
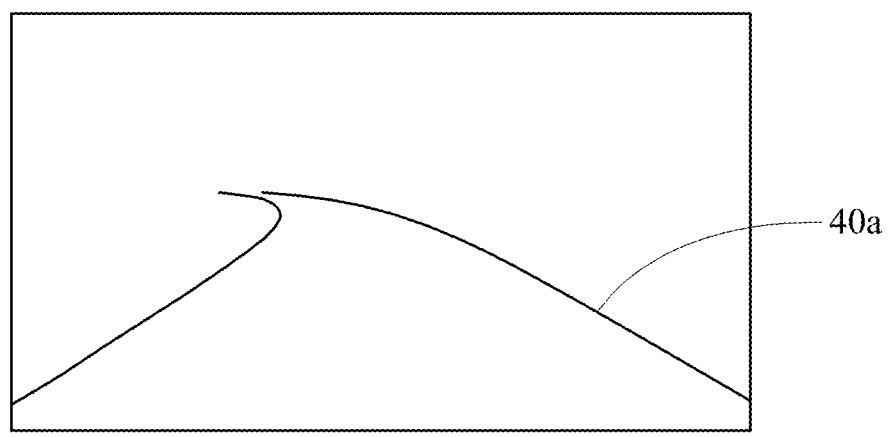
FIGS. 4A to 4C are schematic views of a lane stripe model according to another embodiment of the disclosure.
Figure 4B:
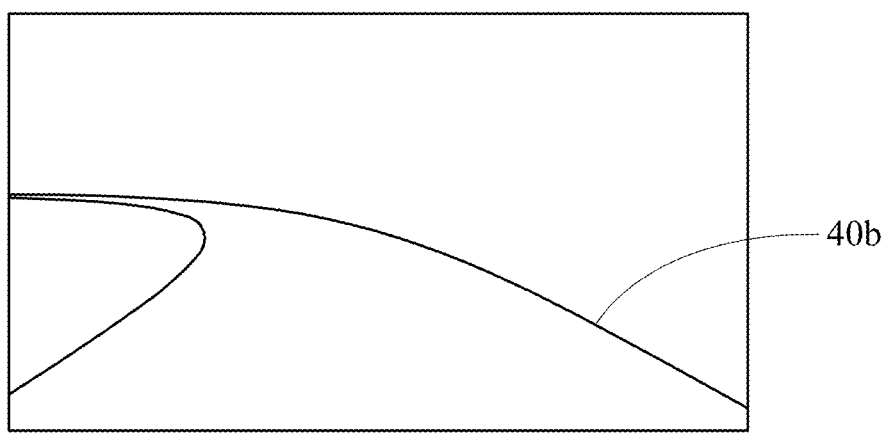
Figure 4C:
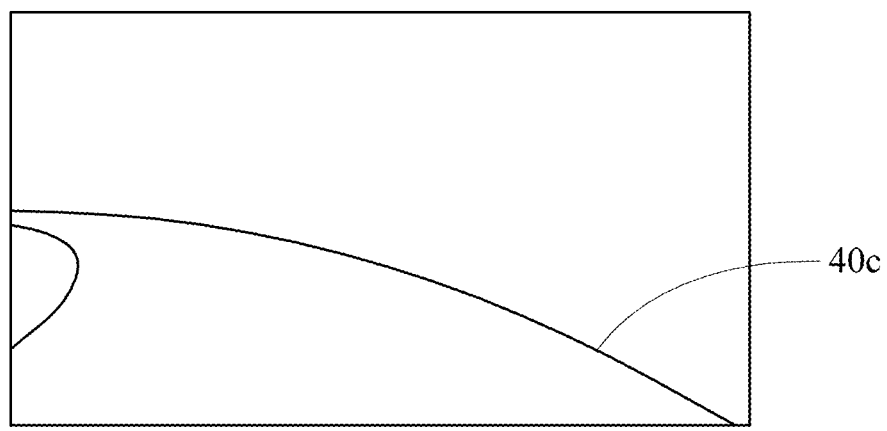
Figure 5:
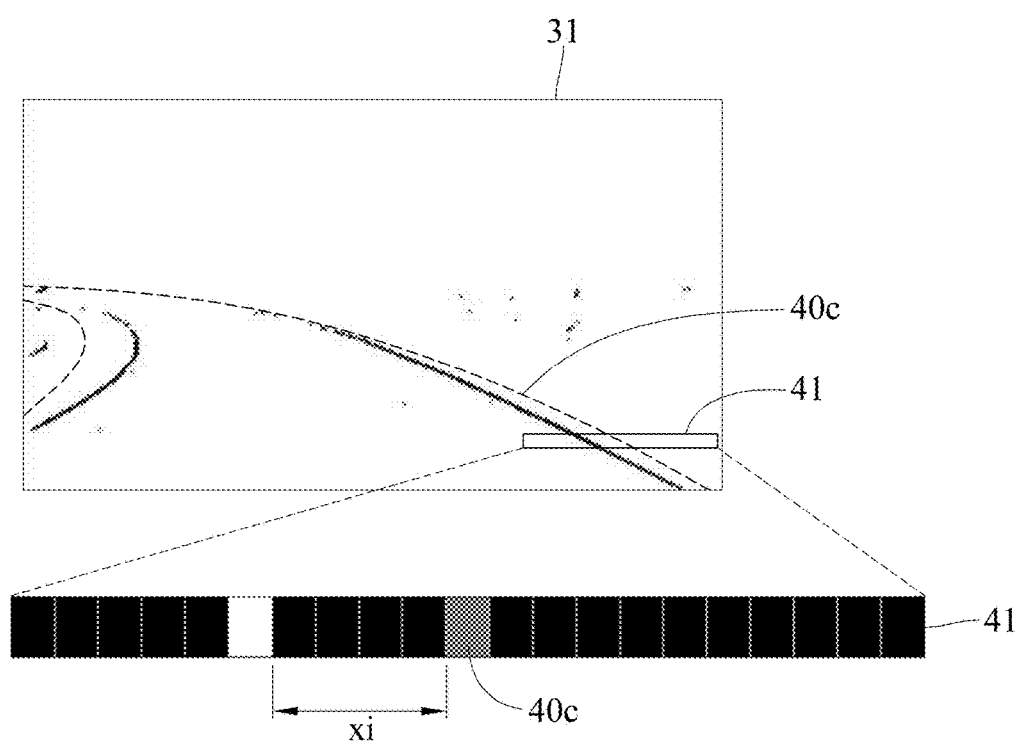
FIG. 5 is a schematic view of the comparison between a roadway image and a lane stripe model according to another embodiment of the disclosure.

Please refer to FIGS. 2 to 5. FIG. 2 is a block diagram of an image analysis device according to another embodiment of the disclosure, FIGS. 3A to 3E are schematic views of a roadway image and a lane stripe image according to the embodiment in FIG. 2, FIGS. 4A to 4C are schematic views of a lane stripe model according to another embodiment of the disclosure, and FIG. 5 is a schematic view of the comparison between a roadway image and a lane stripe model according to another embodiment of the disclosure. As shown in the figures, an image analysis device 20 includes a projection computing module 21, a processing module 22, a determination module 23, an image capturing module 24, a detection module 25, and a noise processing module 26. The image capturing module 24 is electrically connected to the detection module 25, the processing module 22 is electrically connected to the projection computing module 21 and the determination module 23, the detection module 25 is electrically connected to the image capturing module 24, the noise processing module 26 and the determination module 23, and the noise processing module 26 is electrically connected to the projection computing module 21, the detection module 25 and the determination module 23.

In this embodiment, the image capturing module 24 captures a roadway image 30. The image capturing module 24 is disposed on, for example, a vehicle's windshield so that the image capturing module 24 can capture a variety of roadway images 30 with a drive. The detection module 25 receives a variety of roadway images 30 captured by the image capturing module 24 and recognizes a first lane stripe L1 and a second lane stripe L2 in the roadway image 30. The detection module 25 determines a reference point P according to the first lane stripe L1 and the second lane stripe L2 in the roadway image 30.

For example, the first lane stripe L1 is a lane marking at the left side of the vehicle on the lane or any possible boundary of the lane that can be used to recognize the lane on which the vehicle goes, and the second lane stripe L2 is a lane marking at the right side of the vehicle on the lane or any possible boundary of the lane that can be used to recognize the lane on which the vehicle goes. In an embodiment, the reference point P is located in a tangential direction of the first lane stripe L1 and a tangential direction of the second lane stripe L2. Particularly, the detection module 25 recognizes the first lane stripe L1 and the second lane stripe L2 in a peripheral region R of the roadway image 30 and sets the intersection point of the extension of the first lane stripe L1 and the extension of the second lane stripe L2 to be the reference point P. In other words, the reference point P is, for example, the vanish point of the roadway image 30, toward which the extension of the first lane stripe L1 and the extension of the second lane stripe L2 are converged.

The noise processing module 26 receives the data about the reference point P recognized by the detection module 25, and generates and outputs a lane stripe image 31 to the projection computing module 21 by filtering noises in the roadway image 30 according to the reference point P. For example, the noise processing module 26 performs gray or color gradient process onto the roadway image 30 or performs image gradient process onto the roadway image 30 according to its ridge line to form the image shown in FIG. 3B. Then, the noise processing module 26 removes noises from the roadway image 30 according to the position or coordinate of the reference point P. In an embodiment, the noise processing module 26 removes noises above the reference point P in the direction Y, as shown in FIG. 3C. The lane stripe image 31 generated by filtering the roadway image 30 by the noise processing module 26 is outputted to the projection computing module 21. In other words, the lane stripe image 31 is formed by pixels, which possibly present one or more lane stripes and are selected from the roadway image 30 generated by performing image process onto the roadway image 30 by the noise processing module 26.

The projection computing module 21 receives the lane stripe image 31 and rotates the lane stripe image 31 relative to the reference point P as a center of rotation in the lane stripe image 31 to a plurality of preset angles. As shown in FIG. 3C, when the projection computing module 21 has not rotated the lane stripe image 31 yet, a plurality of preset sections would be defined onto the lane stripe image 31, so as to determine the characteristic values of the lane stripe image 31 in the preset sections. For the reference line B, the preset sections are arranged in parallel in the reference line B, and one of the preset sections, a preset section an, is shown as in FIG. 3C. The projection computing module 21 sets the number of units of block of the lane stripe of the lane stripe image 31 in each of the preset sections to be a characteristic value, to constitute the distribution as shown in the lower part of FIG. 3C.

Then, as an example, the projection computing module 21 clockwisely rotates the lane stripe image 31 by a variety of preset angles, which have an interval of 15° therebetween, from 0° to 90°, so as to determine the characteristic values of the lane stripe image 31 in the preset sections, respectively. As shown in FIG. 3D, the lane stripe image 31 is clockwisely rotated by 60°, and a plurality of preset sections is defined onto the lane stripe image 31, so as to respectively determine the characteristic values of the lane stripe image 31 in the preset sections. In this embodiment, for a reference line B, the preset sections are arranged in parallel in the reference line B, as shown by one preset section bn in FIG. 3D. The projection computing module 21 sets the number of units of block of the lane stripe of the 60° clockwisely-rotated lane stripe image 31 in the preset section bn to be a characteristic value, so as to constitute the distribution as shown in the lower part of FIG. 3D. The processing module 22 determines a first feature parameter according to the characteristic values of the lane stripe image in the preset sections whenever the projection computing module 21 rotates the lane stripe image to one of the preset angles.

In an embodiment, as shown in FIG. 3E, the detection module 25 further determines the image center C of the lane stripe image 31 and determines a second feature parameter (referred to as test parameter) according to the displacement of the reference point P relative to the image center C. For example, the second feature parameter is the displacement vector of the reference point P relative to the image center C, or the second feature parameter includes the displacement of the X coordinate of the reference point P relative to the X coordinate of the image center C and the displacement of the Y coordinate of the reference point P relative to the Y coordinate of the image center C, or the second feature parameter is the projection of the displacement vector of the reference point P relative to the image center C on the reference line B, but this embodiment is not limited thereto.

In another embodiment, the detection module 25 further determines a first angle α between the tangential direction of the first lane stripe L1 and a direction V vertical to the reference line B, and determines a third feature parameter (referred to as test parameter) according to the first angle α. The detection module 25 further determines a second angle β between the tangential direction of the second lane stripe L2 and the direction V vertical to the reference line B, and determines a fourth feature parameter (referred to as test parameter) according to the second angle β.

In this embodiment, the determination module 23 includes a classification unit 231, a model generating unit 232, a comparing unit 233 and a searching unit 234. The classification unit 231 determines the model category of the lane stripe image 31 according to the first feature parameter, the second feature parameter, the third feature parameter, the fourth feature parameter or a combination thereof. In this embodiment, the classification unit 231 has a plurality of model categories, and each of the model categories corresponds to a plurality of feature parameter ranges. The classification unit 231 decides the model category of the lane stripe image 31 according to the feature parameter range within which the first feature parameter is, the feature parameter range within which the second feature parameter is, the feature parameter range within which the third feature parameter is, and the feature parameter range within which the fourth feature parameter is.

In this embodiment, each model category defines at least one set of model parameter ranges, and a model parameter range is, for example, the range of the width of a lane model, the range of the curvature of a lane model, the horizontal distance between the left lane stripe and the image center, the front rake angle of a lane model, the angle between the middle line of a lane model and the middle line of the image, the vertical distance between the image capturing module 24 and the ground during capturing images for the simulation of lane models, the focal length parameter of the image capturing module 24 during capturing images for the simulation of lane models, or other parameters related to a lane model. When the classification unit 231 decides the model category of the lane stripe image 31 according to the first feature parameter, the second feature parameter, the third feature parameter, the fourth feature parameter or a combination thereof, a set of model parameter ranges defined by the model category can be obtained.

The model generating unit 232 receives a set of model parameter ranges related to the lane stripe image 31, and respectively generates a plurality of lane stripe models according to each model parameter in each model parameter range, such as lane stripe models $40a$ ~ $40c$, as shown in FIGS. 4A to 4C. In an embodiment, the model generating unit 232 sets one of the model parameters in each model parameter range as a replacement into a model generating formula, to generate a lane stripe model.

The model generating formula is, for example:

$$u_l = f^u \left( \frac{\theta}{\cos\varphi} + \frac{\cos\varphi}{Hf^v} x_c (v_l + f^v \tan\varphi) + \frac{f^v H C_0 / \cos^3\varphi}{4(v_l + f^v \tan\varphi)} \right), \text{ and}$$

$$u_r = f^u \left( \frac{\theta}{\cos\varphi} + \frac{\cos\varphi}{Hf^v} (x_c - L)(v_r + f^v \tan\varphi) + \frac{f^v H C_0 / \cos^3\varphi}{4(v_r + f^v \tan\varphi)} \right),$$

wherein L represents the width of a lane model, C0 represents the curvature of a lane model, xc represents the horizontal distance between the left lane stripe and the image center, φ represents the front rake angle of a lane model, θ represents the angle between the meddle line of a lane model and the meddle line of the image, H represents the vertical distance between the image capturing module 24 and the ground during capturing images for the simulation of lane models, and fu and fv represent the focal length parameters of the image capturing module 24 during capturing images for the simulation of lane models.

As an example based on one of the model parameter ranges, the lane curvature range related to the model category of the lane stripe image 31 is from 0.25 to 0.28, and the model generating unit 232 replaces $C_0$ with 0.25, 0.26, 0.27 and 0.28, for an example, to generate a plurality of lane stripe models, respectively. In other words, the model generating unit 232 respectively sets combinations of different model parameters as replacements into the model generating formula, so as to generate a plurality of lane stripe models of each model category.

In another embodiment, the model generating formula is, for example:

$$u_l - u_0 = a_l(v - v_0) + \frac{b}{v - v_0}, \text{ and}$$

$$u_r - u_0 = a_r(v - v_0) + \frac{b}{v - v_0},$$

wherein (ul,v) represents the coordinate of the first lane stripe, (ur,v) represents the coordinate of the second lane stripe, (u0,v0) represents the coordinate of a reference point, al represents a tangent slope of the first lane stripe, ar represents a tangent slope of the second lane stripe, and b represents a parameter related to the radius of the lane curvature.

In yet another embodiment, the model generating formula is, for example:

$$u_l = a_l v^2 + b_l v + c_l, \text{ and}$$

$$u_r = a_r v^2 + b_r v + c_r,$$

wherein (ul,v) represents the coordinate of the first lane stripe, (ur,v) represents the coordinate of the second lane stripe, and a, b and c are secondary curve parameters.

In addition to the above model generating formulas, other suitable model generating formulas may be used in the model generating unit 232 in this embodiment, and this embodiment is not limited thereabove.

The comparing unit 233 receives the lane stripe image 31 from the noise processing module 26 and receives the lane stripe model in the model category corresponding to the lane stripe image 31 from the model generating unit 232. The comparing unit 233 compares the lane stripe image 31 with each lane stripe model in the model category and selects one lane stripe model according to the difference between the lane stripe image 31 and each lane stripe model.

In an embodiment, as shown in FIG. 5, the comparing unit 233 superimposes the lane stripe model 40c on the lane stripe image 31 for comparison and employs a scan block 41 to scan a lane stripe image 40 along the lane stripe model 40c. The scan block 41 is exemplified as shown in the lower enlarged part of FIG. 5, and includes a plurality of scanning girds arranged in parallel, and the comparing unit 233 detects the difference between the lane stripe in the lane stripe image 31 and the lane stripe model 40c by, for example, moving the scanning girds of the scan block 41 along the lane stripe model 40c to detect the difference between the lane stripe model 40c and the lane stripe in the lane stripe image 31, such as the number of scanning girds xi between the lane stripe model 40c and the lane stripe in the lane stripe image 31. Then, the comparing unit 233 determines the difference between the lane stripe image 31 and each lane stripe model in the model category by a sum of absolute difference method, a root mean square (RMS) method or other suitable calculation methods.

The RMS equation is, for example:

$$x_{rms} = \sqrt{\frac{1}{n}(x_1^2 + x_2^2 + x_3^2 + \ldots + x_n^2)},$$

wherein x1~xn are differences between the lane stripe model 40c and the lane stripe of the lane stripe image 31, detected by the scan block 41, respectively. The comparing unit 233 selects one of the lane stripe models in the model category according to the difference between the lane stripe image 31 and each lane stripe model in the model category. As an example, the selected lane stripe model has the smallest difference with the lane stripe image 31.

The searching unit 234 searches for a set of actual lane parameters in a parameter lookup table according to the lane stripe model selected by the comparing unit 233. The parameter lookup table records the actual lane parameter of each lane stripe model. The actual lane parameter is related to an environmental message of one or more real lanes, such as the width of a real lane, the curvature of a real lane, the actual distance between a left lane stripe and a vehicle, the front rake angle of a vehicle, the angle between the meddle line of a lane and a meddle line of a vehicle, the distance between the image capturing module 24 and the ground, the focal length parameter of the image capturing module 24, or other parameters of one or more real lanes.

In this embodiment, the actual lane parameter looked up by the searching unit 234 can be used as the real situation of one or more lanes while a lane stripe image is being captured, and this actual lane parameter is provided to, for example, an automatic driving assistance system for driving determination. Specifically, the image analysis device 20 sorts lane stripe images and then compares each lane stripe image with a lane stripe model related to the category of the lane stripe image, so it may be achieved to more simplify the complexity of real-time image determination and bring the potency of automatic driving assistance systems into full play.

In the previous embodiment, it is only for an exemplary description that the projection computing module 21 clockwisely rotates the lane stripe image 31 to a variety of preset angles, which have an interval of 15° therebetween, from 0° to 90°; and another embodiment may be contemplated that the projection computing module 21 rotates the lane stripe image 31 to a variety of preset angles, which have an interval of 15° or 20° therebetween, from −90° to 90°, and the disclosure is not limited thereto.

Figure 6:
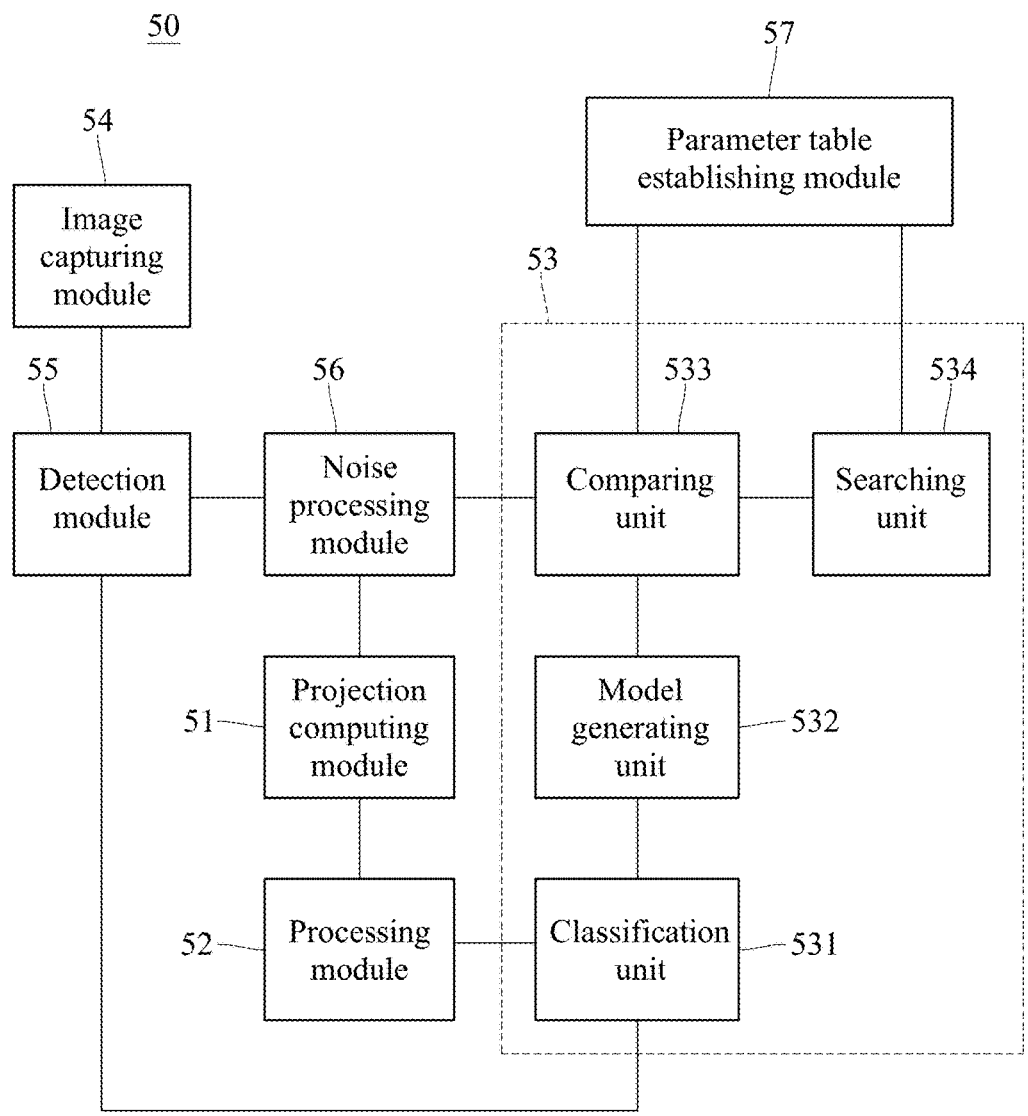
FIG. 6 is a block diagram of an image analysis device according to yet another embodiment of the disclosure.

Please refer to FIG. 6. FIG. 6 is a block diagram of an image analysis device according to yet another embodiment of the disclosure. As shown in FIG. 6, an image analysis device 50 includes a projection computing module 51, a processing module 52, a determination module 53, an image capturing module 54, a detection module 55, a noise processing module 56 and a parameter table establishing module 57. The processing module 52 is electrically connected to the projection computing module 51 and the determination module 53, the detection module 55 is electrically connected to the image capturing module 54, the noise processing module 56 and the determination module 53, and the noise processing module 56 is electrically connected to the projection computing module 51. The determination module 53 includes a classification unit 531, a model generating unit 532, a comparing unit 533 and a searching unit 534. The comparing unit 533 is electrically connected to the noise processing module 56, the model generating unit 532 and a searching unit 534, and the classification unit 531 is electrically connected to the model generating unit 532, the processing module 52 and the detection module 55. The parameter table establishing module 57 is electrically connected to the comparing unit 533 and the searching unit 534.

The projection computing module 51, the processing module 52, the determination module 53, the image capturing module 54, the detection module 55 and the noise processing module 56 are substantially the same as the previous embodiment. Between the previous embodiment and this embodiment, there is a difference that in this embodiment, the parameter lookup table, which is used by the searching unit 534 to search data, is established by collecting data by the parameter table establishing module 57. In this embodiment, the image capturing module 54 captures a plurality of test images in a test environment, and then the detection module 55 and the noise processing module 56 perform image process onto each test image to remove the content of the test image except one or more lane stripes. The environmental message of the test environment indicates at least one actual lane parameter of each test image. For example, the environmental message of the test environment is the width, curvature or other information of a lane in measurement. When the image capturing module 54 captures test images at a variety of image capturing positions in a test environment, a different image capturing position corresponds to a different actual lane parameter. In other words, the image capturing module 54 provides a variety of actual lane parameters for a variety of image capturing positions in a test environment, so a test image captured at a variety of image capturing positions by the image capturing module 54 corresponds to a set of actual lane parameters related to the image capturing position.

The projection computing module 51 receives the test image and rotates the received test image relative to a reference point as a center of rotation in the received test image to a plurality of preset angles. Whenever the test image is rotated to one of the preset angles, the projection computing module 51 defines a plurality of preset sections onto the test image and determines the characteristic value of the test image in each of the preset sections. The processing module 52 determines the first feature parameter of the test image according to the characteristic value in each of the preset sections whenever the projection computing module 51 recognizes the test image in at least one of the default directions. In another embodiment, the detection module 55 determines the image center of each test image and determines the second feature parameter of each test image according to the displacement of a reference point in the test image relative to the image center. The detection module 55 determines the third feature parameter of each test image according to the first angle between the tangential direction of the first lane stripe and the direction vertical to the reference line. The detection module 45 determines the fourth feature parameter of each test image according to the second angle between the tangential direction of the second lane stripe and the direction vertical to the reference line.

The classification unit 531 determines the model category of each test image according to the first feature parameter, the second feature parameter, the third feature parameter, the fourth feature parameter, or a combination thereof. In practice, the classification unit 531 provides a plurality of model categories, and each of the model categories corresponds to a plurality of feature parameter ranges. The determination module 53 decides the model category of each test image according to the feature parameter ranges which the first feature parameter, the second feature parameter, the third feature parameter and the fourth feature parameter are respectively within.

The model generating unit 532 receives a set of model parameter ranges related to the test image, and respectively generates a plurality of lane stripe models according to each model parameter in each model parameter range. The manner used by the model generating unit 532 to generate the lane stripe models can be referred to the previous embodiment or be other suitable manners, and there are no more related descriptions.

Then, the comparing unit 533 receives each test image from the noise processing module 56 and the lane stripe models related to the model category of the test image from the model generating unit 532. The comparing unit 533 compares the test image with each lane stripe model related to the model category, and selects one of the lane stripe models for each test image according to the difference between the test image and each lane stripe model. The comparing unit 533 is not limited to superimpose the test image and a lane stripe model together for determination as described in the previous embodiment.

The comparing unit 533 selects one of the lane stripe models related to the model category according to the difference between the test image and each lane stripe model in the model category. The selected lane stripe model is a lane stripe model having a relatively-small difference with the test image.

The parameter table establishing module 57 establishes a parameter lookup table according to the lane stripe model selected by the comparing unit 533 and the actual lane parameter of the test image. In other words, the image analysis device 50 captures a plurality of test images in a test environment and uses known actual lane parameters related to the test environment and the lane stripe models of each test image to establish a relationship table so that the searching unit 534 can look up a set of actual lane parameters related to a lane stripe image in the parameter lookup table and provide them to an automatic driving assistance system for the determination basis of automatic driving.

In this embodiment, the parameter table establishing module 57 permits the image analysis device 50 to establish complicated information determination. On the other hand, when each image analysis device is disposed in a variety of environments, such as the automatic driving assistance system of a variety of vehicle models, a variety of vehicle models have their respective determination bases in the same physical environment having lane stripes. The parameter table establishing module 57 can establish a variety of parameter lookup tables for a variety of vehicle models, so the image analysis device may be applied more widely.

Figure 7:
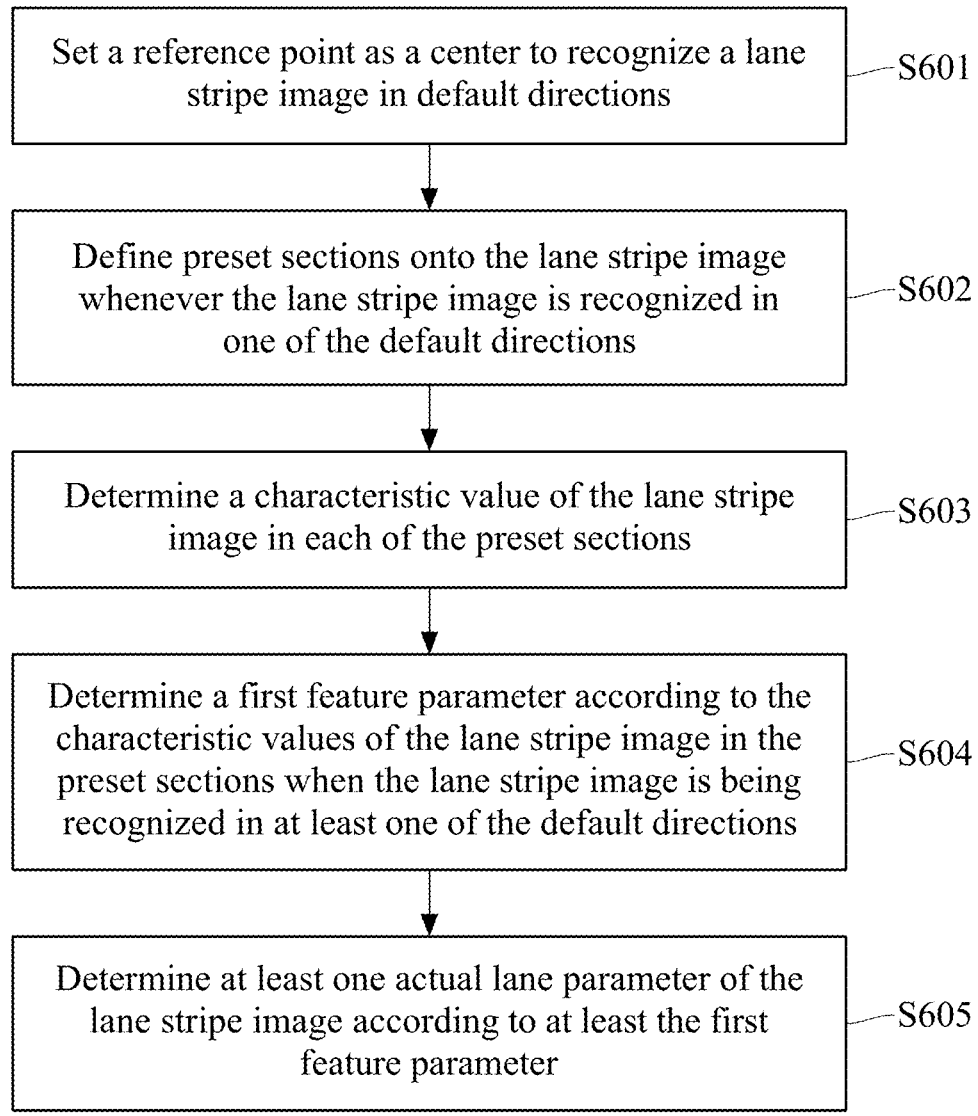
FIG. 7 is a flow chart of an analysis method of lane stripe images according to an embodiment of the disclosure.

For a more clear description of the lane stripe analysis method, please refer to FIG. 7. FIG. 7 is a flow chart of an analysis method of lane stripe images according to an embodiment of the disclosure. As shown in FIG. 7, in step S601, a reference point is set as a center to recognize a lane stripe image in a plurality of default directions. In step S602, whenever the lane stripe image is recognized in one of the default directions, a plurality of preset sections, which is arranged in parallel in a reference line vertical to the default direction, is defined onto the lane stripe image. In step S603, the characteristic value of the lane stripe image in each of the preset sections is determined. In step S604, a first feature parameter is determined according to the characteristic values of the lane stripe image in the preset sections when the lane stripe image is recognized in at least one of the default directions. In step S605, at least one actual lane parameter corresponding to the lane stripe image is determined according to at least the first feature parameter. The actual lane parameter is related to an environmental message of one or more real lanes. The foregoing lane stripe analysis method has been described in detail in the previous embodiments, and there are no more descriptions hereafter.

Figure 8:
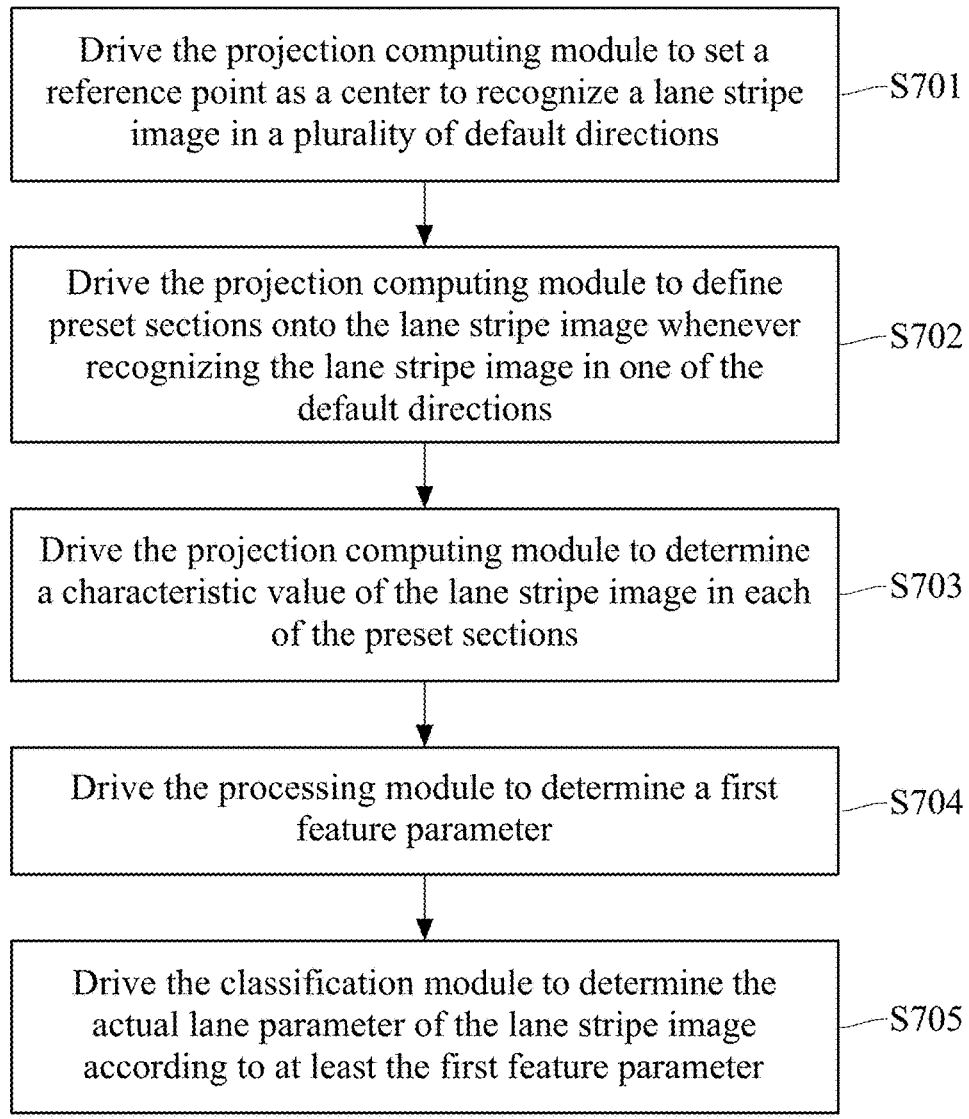
FIG. 8 is a flow chart of a non-transitory computer readable medium executable to the image analysis device according to an embodiment of the disclosure.

Next, refer to FIG. 1 and FIG. 8. FIG. 8 is a flow chart of a non-transitory computer readable medium executable to a lane stripe detection device according to an embodiment of the disclosure. As shown in FIG. 8, the foregoing analysis method can be applied to automatic driving assistance systems, a vehicle's computer system, automotive computers, the image analysis device 10 or other suitable electronic devices in practice. In other words, the lane stripe analysis method in this embodiment can be programmed by one or more computer program languages to produce a non-transitory computer readable medium, and the non-transitory computer readable medium will be read by the image analysis device 10 to analyze a variety of lane stripe images. When the image analysis device 10 executes a program stored in the non-transitory computer readable medium to perform the analysis method of lane stripe images, as described in the steps in FIG. 7. In step S701, the projection computing module 11 is driven to set a reference point as a center to recognize a lane stripe image in a plurality of default directions. In step S702, the projection computing module 11 is driven to define a plurality of preset sections onto the lane stripe image whenever recognizing the lane stripe image in one of the default directions. In step S703, the projection computing module 11 is driven to determine the characteristic value of the lane stripe image in each of the preset sections. In step S704, the processing module 12 is driven to determine a first feature parameter. In step S704, the determination module 13 is driven to determine at least one actual lane parameter of the lane stripe image according to at least the first feature parameter. In view of the foregoing embodiment, a person of ordinary skill in the art can understand how the processor reads the executable content from the non-transitory computer readable medium, and thus, there are no more descriptions hereafter.

To sum up, the disclosure provides an image analysis device, an analysis method and a non-transitory computer readable medium thereof, to analyze the characteristic value of a lane stripe image in each of the preset sections while rotating the lane stripe image to a variety of preset angles, and determine the model category of the lane stripe image according to the characteristic values. Therefore, the disclosure may achieve the lower complexity of calculation for the analysis of lane stripes, resulting in the lower cost of automatic driving assistance systems.

What is claimed is:

1. An analysis method of lane stripe images, comprising:
setting a reference point as a center to recognize the lane stripe image in a plurality of default directions;
defining a plurality of preset sections, which is arranged in parallel in a reference line vertical to the default direction, of the lane stripe image whenever the lane stripe image is being recognized in one of the default directions;
determining a characteristic value of the lane stripe image in each of the preset sections;
determining a first feature parameter according to the characteristic values of the lane stripe image in the preset sections when the lane stripe image is being recognized in at least one of the default directions; and
determining at least one actual lane parameter of the lane stripe image, which is associated with an environmental message of one or more real lanes, according to at least the first feature parameter,
wherein said at least one actual lane parameter is determined based on a plurality of image recognition results respectively for the plurality of default directions.

2. The analysis method according to claim 1, wherein recognizing the lane stripe image in each of the default directions comprises:
rotating the lane stripe image to a plurality of preset angles relative to the reference point as a center of rotation, wherein when the lane stripe image is rotated to one of the preset angles, the lane stripe image is recognized.

3. The analysis method according to claim 1, wherein determining the actual lane parameter of the lane stripe image comprises:
determining a model category of the lane stripe image, which has a model parameter range comprising a plurality of model parameters, according to at least the first feature parameter;
respectively generating a plurality of lane stripe models according to each of the model parameters in the model parameter range;
comparing the lane stripe image with the lane stripe models;
selecting one of the lane stripe models according to a difference between the lane stripe image and each of the lane stripe models; and
searching for the actual lane parameter related to the selected lane stripe model in a parameter lookup table which records the actual lane parameters respectively corresponding to the lane stripe models.

4. The analysis method according to claim 3, further comprising:
capturing a roadway image by an image capturing module;
recognizing a first lane stripe and a second lane stripe in the roadway image;
determining the reference point, which is located in a tangential direction of the first lane stripe and a tangential direction of the second lane stripe, according to the first lane stripe and the second lane stripe in the roadway image; and
generating the lane stripe image by filtering noises in the roadway image according to the reference point.

5. The analysis method according to claim 4, further comprising:
determining an image center of the roadway image; and
determining a second feature parameter according to a displacement of the reference point relative to the image center,
wherein the second feature parameter is also used to determine the model category of the lane stripe image.

6. The analysis method according to claim 5, further comprising:
determining a first angle between the tangential direction of the first lane stripe and a direction vertical to the reference line;
determining a third feature parameter according to the first angle;
determining a second angle between the tangential direction of the second lane stripe and the direction vertical to the reference line; and
determining a fourth feature parameter according to the second angle,
wherein the third feature parameter and the fourth feature parameter are further used to determine the model category of the lane stripe image.

7. The analysis method according to claim 4, further comprising:
capturing a plurality of test images in a test environment by the image capturing module, and an environmental message of the test environment recording the at least one actual lane parameter of each of the test images;
determining the lane stripe model of each of the test images; and
establishing the parameter lookup table according to the lane stripe model of each of the test images and the at least one actual lane parameter.

8. The analysis method according to claim 7, wherein determining the lane stripe model of each of the test images comprises:
rotating one of the test images to a plurality of preset angles relative to the reference point as a center of rotation;
defining the preset sections onto the test image when the test image is rotated to one of the preset angles;
determining a test parameter of the test image according to the characteristic values of the lane stripe image in the preset sections when the test image is rotated to one of the preset angles;
determining the model category of the test image according to at least the test parameter;
comparing the test image with the lane stripe models; and
selecting the lane stripe model of the test image according to a difference between the test image and each of the lane stripe models.

9. An image analysis device, comprising:
a projection computing module configured to set a reference point as a center to recognize a lane stripe image in a plurality of default directions, define a plurality of preset sections, which is arranged in parallel in a reference line that is vertical to the default direction, of the lane stripe image, and determine a characteristic value of the lane stripe image in each of the preset sections whenever the lane stripe image is recognized in one of the default directions;
a processing module electrically connected to the projection computing module and configured to determine a first feature parameter according to the characteristic values of the lane stripe image in the preset sections when the lane stripe image is recognized in at least one of the default directions; and
a determination module electrically connected to the processing module and configured to determine at least one actual lane parameter of the lane stripe image, which is associated with a environmental message of one or more real lanes, according to at least the first feature parameter,
wherein said at least one actual lane parameter is determined based on a plurality of image recognition results respectively for the plurality of default directions.

10. The image analysis device according to claim 9, wherein the projection computing module further rotates the lane stripe image to a plurality of preset angles relative to the reference point as a center of rotation, and when the lane stripe image is rotated to one of the preset angles, the projection computing module recognizes the lane stripe image.

11. The image analysis device according to claim 9, wherein the determination module comprises:

a classification unit configured to determine a model category of the lane stripe image, which has a model parameter range comprising a plurality of model parameters, according to at least the first feature parameter;

a model generating unit electrically connected to the classification unit and configured to respectively generate a plurality of lane stripe models according to each of the model parameters in the model parameter range;

a comparing unit electrically connected to the model generating unit and configured to compare the lane stripe image with the lane stripe models and select one of the lane stripe models according to a difference between the lane stripe image and each of the lane stripe models; and a searching unit configured to search for the actual lane parameter of the lane stripe model in a parameter lookup table according to the lane stripe model selected by the comparing unit, and the parameter lookup table recording the actual lane parameter of each of the lane stripe models.

12. The image analysis device according to claim 11, further comprising:

an image capturing module configured to capture a roadway image;

a detection module electrically connected to the image capturing module and configured to recognize at least a first lane stripe and a second lane stripe in the roadway image and determine the reference point according to the first lane stripe and the second lane stripe in the roadway image, and the reference point being located in a tangential direction of the first lane stripe and a tangential direction of the second lane stripe; and a noise processing module electrically connected to the detection module and the projection computing module and configured to generate and output the lane stripe image to the projection computing module by filtering noises in the roadway image according to the reference point recognized by the detection module.

13. The image analysis device according to claim 12, wherein the detection module further determines an image center of the roadway image and determines a second feature parameter according to a displacement of the reference point relative to the image center, and the classification unit further determines the model category of the lane stripe image according to the second feature parameter.

14. The image analysis device according to claim 13, wherein the detection module further determines a first angle between the tangential direction of the first lane stripe and a direction vertical to the reference line, and determines a third feature parameter according to the first angle;

the detection module further determines a second angle between the tangential direction of the second lane stripe and the direction vertical to the reference line, and determines a fourth feature parameter according to the second angle; and the classification unit further determines the model category of the lane stripe image according to the third feature parameter and the fourth feature parameter.

15. The image analysis device according to claim 12, wherein the image capturing module captures a plurality of test images in a test environment, an environmental message of the test environment record the at least one actual lane parameter of each of the test images, and the projection computing module, the processing module and the determination module determine the lane stripe model of each of the test images, and the image analysis device further comprises:

a parameter table establishing module configured to establish the parameter lookup table according to the lane stripe model of each of the test images and the at least one actual lane parameter.

16. The image analysis device according to claim 15, wherein the projection computing module rotates one of the test images to a plurality of preset angles relative to the reference point as a center of rotation, and when the test image is rotated to one of the preset angles, the projection computing module defines the preset sections onto the test image and determines the characteristic values of the lane stripe image in the preset sections, the processing module determines a test parameter of the test image according to the characteristic values of the lane stripe image in the preset sections, the classification unit determines the model category of the test image according to at least the test parameter, and the comparing unit compares the test image with the lane stripe models and selects the lane stripe model of the test image according to a difference between the test image and each of the lane stripe models.

17. A non-transitory computer readable medium comprising a program for being executed by an electronic device, which comprises a projection computing module, a processing module and a determination module, to perform steps of:

driving the projection computing module to set a reference point as a center to recognize a lane stripe image in a plurality of default directions;

driving the projection computing module to define a plurality of preset sections, which is arranged in parallel in a reference line vertical to the default direction, of the lane stripe image and determine a characteristic value of the lane stripe image in each of the preset sections whenever recognizing the lane stripe image in one of the default directions;

driving the processing module to determine a first feature parameter related to the characteristic values of the lane stripe image in the preset sections when the lane stripe image is recognized in at least one of the default directions; and driving the determination module to determine at least one actual lane parameter of the lane stripe image according to at least the first feature parameter, and the actual lane parameter being related to an environmental message of one or more real lanes, wherein said at least one actual lane parameter is determined based on a plurality of image recognition results respectively for the plurality of default directions.

18. The non-transitory computer readable medium according to claim 17, wherein the step of driving the projection computing module to set the reference point to recognize the lane stripe image in the default directions comprises:

driving the projection computing module to rotate the lane stripe image to a plurality of preset angles relative to the reference point as a center of rotation, wherein when the lane stripe image is rotated to one of the preset angles, the projection computing module recognizes the lane stripe image.

19. The non-transitory computer readable medium according to claim 17, wherein the determination module further comprises a classification unit, a model generating unit, a comparing unit and a searching unit, and the non-transitory computer readable medium executable to the electronic device to further perform steps of:

driving the classification unit to determine a model category of the lane stripe image, which has a model parameter range comprising a plurality of model parameters, according to at least the first feature parameter;

driving the model generating unit to respectively generate a plurality of lane stripe models according to each of the model parameters in the model parameter range;

driving the comparing unit to compare the lane stripe image with the lane stripe models and select one of the lane stripe models according to a difference between the lane stripe image and each of the lane stripe models; and driving the searching unit to search for the actual lane parameter of the selected lane stripe model in a parameter lookup table that records the actual lane parameter of each of the lane stripe models.

20. The non-transitory computer readable medium according to claim 19, wherein the electronic device further comprises an image capturing module, a detection module and a noise processing module, and the non-transitory computer readable medium is executable to the electronic device to further perform steps of:

driving the image capturing module to capture a roadway image;

driving the detection module to recognize a first lane stripe and a second lane stripe in the roadway image;

driving the detection module to determine the reference point, which is located in a tangential direction of the first lane stripe and a tangential direction of the second lane stripe, according to the first lane stripe and the second lane stripe in the roadway image; and driving the noise processing module to generate and output the lane stripe image to the projection computing module by filtering noises in the roadway image according to the reference point recognized by the detection module.

21. The non-transitory computer readable medium according to claim 20, wherein the electronic device executes the program in the non-transitory computer readable medium to further perform steps of:

driving the detection module to determine an image center of the roadway image;

driving the detection module to determine a second feature parameter according to a displacement of the reference point relative to the image center; and driving the classification unit to determine the model category of the lane stripe image further according to the second feature parameter.

22. The non-transitory computer readable medium according to claim 21, wherein the electronic device executes the program in the non-transitory computer readable medium to further perform steps of:

driving the detection module to determine a first angle between the tangential direction of the first lane stripe and a direction vertical to the reference line, and determine a third feature parameter according to the first angle;

driving the detection module to determine a second angle between the tangential direction of the second lane stripe and the direction vertical to the reference line, and determine a fourth feature parameter according to the second angle; and driving the classification unit to determine the model category of the lane stripe image further according to the third feature parameter and the fourth feature parameter.

23. The non-transitory computer readable medium according to claim 20, wherein the electronic device further comprises a parameter table establishing module, and the electronic device executes the program in the non-transitory computer readable medium to further perform steps of:

driving the image capturing module to capture a plurality of test images in a test environment, and an environmental message of the test environment recording the at least one actual lane parameter of each of the test images;

driving the projection computing module, the processing module and the determination module to determine the lane stripe model of each of the test images; and driving the parameter table establishing module to establish the parameter lookup table according to the lane stripe model of each of the test images and the at least one actual lane parameter.

24. The non-transitory computer readable medium according to claim 23, wherein the electronic device executes the program in the non-transitory computer readable medium to further perform steps of:

driving the projection computing module to rotate one of the test images to a plurality of preset angles relative to the reference point as a center of rotation;

driving the projection computing module to define the preset sections onto the test image and determine the characteristic values of the lane stripe image in the preset sections when the test image is rotated to one of the preset angles;

driving the processing module to determine a test parameter of the test image according to the characteristic values of the lane stripe image in the preset sections;

driving the classification unit to determine the model category of the test image according to at least the test parameter; and driving the comparing unit to compare the test image with the lane stripe models and select the lane stripe model of the test image according to a difference between the test image and each of the lane stripe models.

* * * * *